United States Patent
Park

(10) Patent No.: US 9,794,241 B2
(45) Date of Patent: Oct. 17, 2017

(54) SYSTEM AND METHOD FOR CONNECTING TO SECURITY DEVICE BY MEANS OF PEER-TO-PEER (P2P) RELAY DEMON

(71) Applicant: ITX SECURITY CO., LTD., Seoul, Geumcheon-gu (KR)

(72) Inventor: Dong Uk Park, Gwangmyeong-si (KR)

(73) Assignee: ITX SECURITY CO., LTD., Seoul (KR)

( * ) Notice: Subject to any disclaimer, the term of this patent is extended or adjusted under 35 U.S.C. 154(b) by 0 days.

(21) Appl. No.: 14/743,022

(22) Filed: Jun. 18, 2015

(65) Prior Publication Data

US 2015/0373000 A1 Dec. 24, 2015

(30) Foreign Application Priority Data

Jun. 24, 2014 (KR) .......................... 10-2014-0077643

(51) Int. Cl.
*H04L 29/06* (2006.01)
*H04L 29/08* (2006.01)

(52) U.S. Cl.
CPC ............ *H04L 63/08* (2013.01); *H04L 67/104* (2013.01); *H04L 69/08* (2013.01); *H04L 67/02* (2013.01); *H04L 69/164* (2013.01)

(58) Field of Classification Search
CPC ...................................................... G06F 21/31
See application file for complete search history.

(56) References Cited

U.S. PATENT DOCUMENTS

| | | | |
|---|---|---|---|
| 7,328,280 B2 * | 2/2008 | Takeda | H04L 29/12066 709/245 |
| 7,627,678 B2 | 12/2009 | Datta et al. | |
| 8,958,559 B2 | 2/2015 | Medina et al. | |
| 9,021,134 B1 * | 4/2015 | Patel | H04L 67/2823 709/246 |
| 2014/0040623 A1 * | 2/2014 | Conus | H04N 21/222 713/176 |
| 2014/0201262 A1 * | 7/2014 | Woo | H04L 67/42 709/203 |

FOREIGN PATENT DOCUMENTS

| KR | 10-2003-0062180 A | 7/2003 |
|---|---|---|
| KR | 10-0555096 B1 | 2/2006 |
| KR | 10-2006-0057833 A | 5/2006 |
| KR | 10-2006-0094964 A | 8/2006 |
| KR | 10-2014-0025553 A | 3/2014 |

* cited by examiner

*Primary Examiner* — Kambiz Zand
*Assistant Examiner* — Thanh Le
(74) *Attorney, Agent, or Firm* — NSIP Law

(57) ABSTRACT

A system and method for connecting to a security device by means of a Peer-to-Peer (P2P) relay demon. In the present disclosure, a P2P technology is applied to a technology for connecting to a security device, such as a Network Video Recorder (NVR), Digital Video Recorder (DVR), or Internet Protocol (IP) camera, to thereby communicate with the security device in a safe and convenient way.

10 Claims, 2 Drawing Sheets

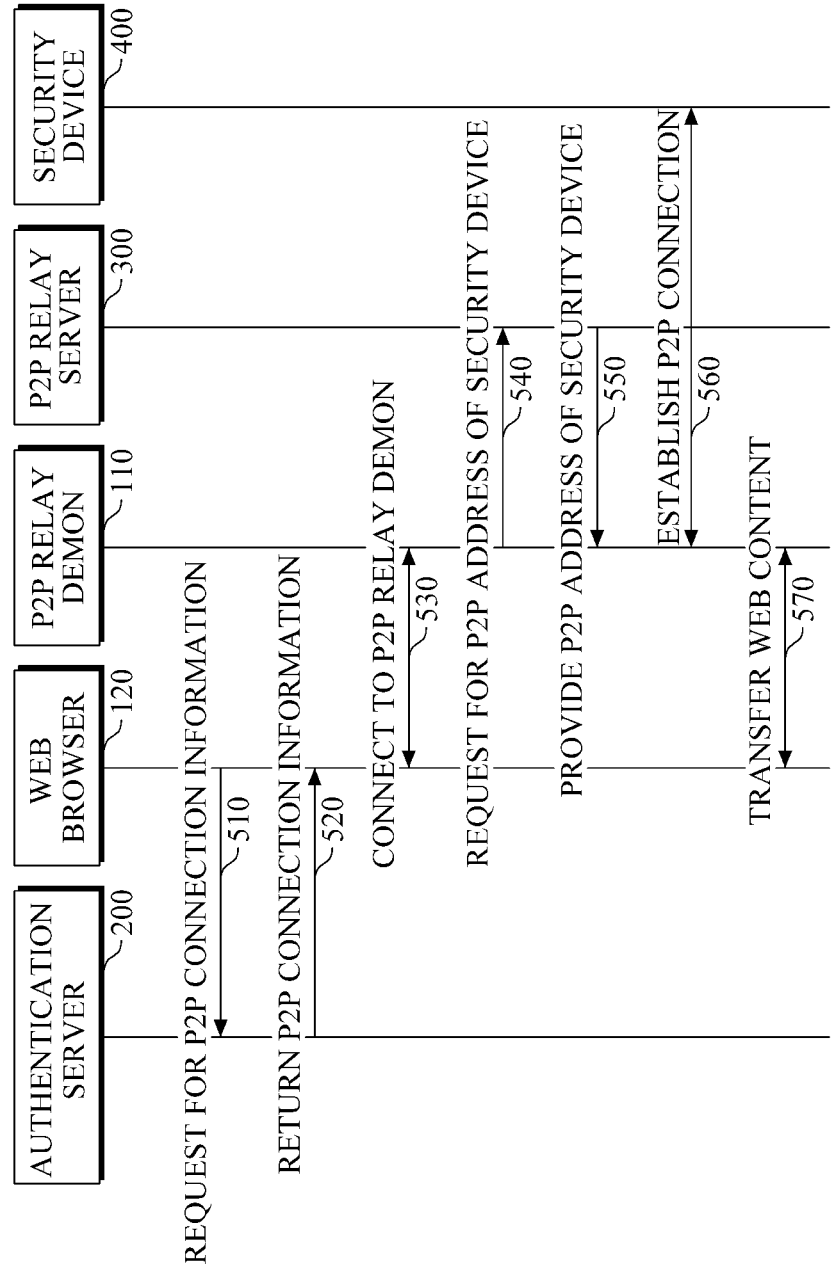

SYSTEM AND METHOD FOR CONNECTING TO SECURITY DEVICE BY MEANS OF PEER-TO-PEER (P2P) RELAY DEMON

CROSS-REFERENCE TO RELATED APPLICATION(S)

This application claims priority from Korean Patent Application No. 10-2014-0077643, filed on Jun. 24, 2014, in the Korean Intellectual Property Office, the entire disclosure of which is incorporated herein by reference for all purposes.

BACKGROUND

1. Field

The following description relates to a technology for connecting to a security device, such as a Network Video Recorder (NVR), Digital Video Recorder (DVR), or Internet Protocol (IP) camera, and more particularly to a system and method for connecting to a security device by means of a Peer-to-Peer (P2P) relay demon.

2. Description of the Related Art

HTML data communicating on a general web browser is based on a Transmission Control Protocol (TCP), so it is hard to perform P2P communication on the HTML data. Korean Patent Publication No. 10-2006-0094964 (Aug. 30, 2006) suggested a P2P relay technology.

The inventor of this present disclosure has studied a technology that enables communicating with a security device, such as a Network Video Recorder (NVR), Digital Video Recorder (DVR), or Internet Protocol (IP) camera, conveniently and safely, once a user inputs a web address of the security device on an address window of an existing web browser.

SUMMARY

According to one general aspect, there is provided a system for connecting to a security device by means of a Peer-to-Peer (P2P), including a user terminal configured to comprise a P2P relay demon configured to have a local web server that performs P2P communication with the security device by converting Hyper Text Transfer Protocol (HTTP) data into User Datagram Protocol (UDP) data, and a web browser configured to connect to the P2P relay demon using a HTTP.

The system may further include an authentication server configured to receive security device identification information from the web browser, and, in response to activation of a P2P function of a security device corresponding to the received security device identification information, return P2P connection information of the security device to the web browser.

The security device identification information may be a Dynamic Domain Name System (DDNS) address of a security device.

The P2P connection information may include P2P relay demon connection information and P2P connection identification information corresponding to the security device identification information.

The web browser may be further configured to connect to the P2P relay demon based on the P2P relay demon connection information and provide the P2P relay demon with the P2P connection identification information.

The system may further include a P2P relay server configured to receive a request for a P2P address of a security device corresponding to the P2P connection identification information from the P2P relay demon, and provide the P2P relay demon with the requested P2P address.

The P2P relay demon may be further configured to establish P2P connection with the P2P address provided by the P2P relay server.

The P2P relay demon may be further configured to transfer, to the web browser, web content acquired from the security device with which P2P connection has been established.

According to another general aspect, there is provided a method for connecting to a security device by means of a Peer-to-Peer (P2P) relay demon, including: requesting, by a web browser installed in a user terminal, P2P connection information corresponding to security device identification information from an authentication server; in response to activation of a P2P function of a security device corresponding to the security device identification information, returning, by an authentication server, P2P relay demon connection information and P2P connection identification information corresponding to the security identification information to the web browser; the web browser connecting to a P2P relay demon having a local web server based on the P2P relay demon connection information, and providing the P2P connection identification information to the P2P relay demon; requesting, by the P2P relay demon, a P2P address of a security device corresponding to the P2P connection identification information from the P2P relay server; providing, by the P2P relay server, the requested P2P address to the P2P relay demon; and establishing, by the P2P relay demon, P2P connection with the P2P address provided by the P2P relay server.

The method may further include transferring, by the P2P relay demon, to the web browser, web content acquired from the security device with which the P2P connection has been established.

Other features and aspects may be apparent from the following detailed description, the drawings, and the claims.

BRIEF DESCRIPTION OF THE DRAWINGS

FIG. 2 is a flowchart illustrating a method for connecting to a security device by means of a P2P relay demon according to an exemplary embodiment of the present disclosure.

Figure 1:
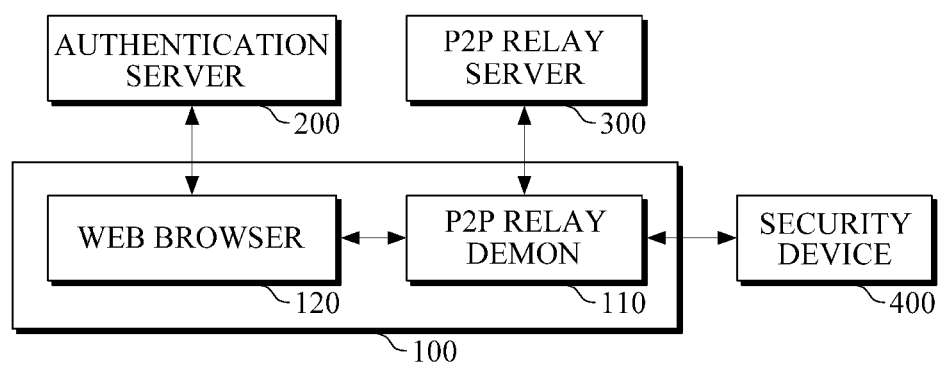
FIG. 1 is a block diagram illustrating a configuration of a system for connecting to a security device by means of a Peer-to-Peer (P2P) relay demon according to an exemplary embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a block diagram illustrating a configuration of a system for connecting to a security device by means of a Peer-to-Peer (P2P) relay demon according to an exemplary embodiment of the present disclosure. As illustrated in FIG. 1, a system for connecting to a security device by means of a Peer-to-Peer (P2P) relay demon includes a user terminal, which includes a P2P relay demon 110, and a web browser 120. For example, the user terminal 100 may be a PC.

The P2P relay demon 110 may include a local web server that performs P2P communication with a security device 400 by converting Hyper Text Transfer Protocol (HTTP) data into User Datagram Protocol (UDP) data.

The web browser 120 connects to the P2P relay demon 110 using a HTTP. Once a user inputs an address of the security device 400 on an address window of the web browser 120 in the same way of web connection, the P2P relay demon 110 establishes P2P connection with the security device 400, so that P2P communication may be established between the user terminal 100 and the security device 400.

Compared to web connection using Active-X, P2P connection established as above is more resilient to malicious codes and spywares and more incompatible with a different operating system. In addition, port forwarding is not necessary, so connection between the user terminal 100 and the security device 400 may be established conveniently and rapidly.

According to another general aspect, the system for connecting to a security device by means of a P2P relay demon may further include an authentication server 200. The authentication server 200 receives security device identification information from the web browser 120, and, in the case where a P2P function of a security device corresponding the security device identification information is activated, returns P2P connection information of the security device to the web browser 120.

For example, determination as to whether a P2P function of a security device is activated is possible to be made by receiving P2P connection identification information in advance from the security device, e.g., an IP address, and a port number of a security device corresponding to security device identification information, and then storing the received P2P connection identification information.

The security device identification information may be a Dynamic Domain Name System (DDNS) address of a security device, for example, "mydvr.dyndns.org", and the P2P connection information may be, for example, "http://localhost:8080/info?host=mydvr" that includes "http://localhost:8080", which is P2P relay demon connection information, and "mydvr" which is P2P connection identification information corresponding to security device identification information.

According to yet another general aspect, the web browser 120 may connect to the P2P relay demon 110 based on P2P relay demon connection information, and provide the P2P relay demon 110 with P2P connection identification information.

According to yet another general aspect, the system for connecting to a security device by means of a P2P relay demon may further include a P2P relay server 300. The P2P relay server 300 receives, from the P2P relay demon 100, a request for a P2P address of a security device 400 corresponding to P2P connection identification information, and provides the P2P relay demon 110 with the requested P2P address. That is, the P2P relay server 300 controls P2P connection using a User Datagram Protocol (UDP) hole punching technique.

Then, the P2P relay demon 110 establishes P2P connection with the P2P address provided by the P2P relay server 300. Next, the P2P relay demon 110 transfers, to the web browser 120, web content acquired from the security device 400 with which P2P connection has been established, so that P2P communication may be established between the user terminal 100 and the security device 400.

Compared to Web connection using Active-X, P2P connection established as above is more resilient to malicious codes and spywares and more compatible with a different operating system. In addition, port forwarding is not necessary, so that connection between the user terminal 100 and the security device 400 may be established conveniently and rapidly.

Hereinafter, operations for establishing connection between the user terminal 100 and the security device 400 in the above-described system are described with reference to FIG. 2. FIG. 2 is a flowchart illustrating a method for connecting to a security device by means of a P2P relay demon according to an exemplary embodiment of the present disclosure.

Once a user inputs security device identification information on an address window of the web browser 120 installed in the user terminal 100, the web browser 120 requests P2P connection information corresponding to the security device identification information from the authentication server 200 in 510. For example, the security device identification information may be a DDNS address of a security device.

In response to the request from the web browser 120, in the case where a P2P function of a security device corresponding to the security device identification information is activated, the authentication server 200 returns P2P relay demon connection information and P2P connection information, which includes the P2P connection identification information corresponding to the security device identification information, to the web browser 120 in 520.

In response to receipt of the P2P relay demon connection information and the P2P connection information from the authentication server 200, the web browser 120 connects to a P2P relay demon 110 having a local web server based on the P2P relay demon connection information in 530, and provides the P2P relay demon 110 with the P2P connection identification information.

In response to receipt of the P2P connection identification information from the web browser 120, the P2P relay demon 110 requests a P2P address of the security device 400 corresponding to the P2P connection identification from the P2P relay server 300 in 540.

In response to receipt of the request for a P2P address of the security device 400 corresponding to the P2P connection identification information, the P2P relay server 300 provides the P2P relay demon 120 with the requested P2P address in 550.

In response to receipt of the P2P address of the security device 400 corresponding to the P2P connection identification information from the P2P relay server 300, the P2P relay demon 120 establishes P2P connection with the received P2P address of the security device 400 in 560.

When P2P connection is established between the P2P relay demon 120 and the security device 400, the P2P relay demon 120 transfers, to the web browser 120, web content acquired from the security device 400 in 570.

Accordingly, the present disclosure may enable establishing connection between a user terminal and a security device, the connection which is resilient to malicious codes and spywares and more compatible with a different operating system compared to web connection using Active-X. In addition, port forwarding is not necessary so that the connection may be established conveniently and rapidly. Therefore, the present disclosure may achieve the aforementioned objective.

The present disclosure applies a P2P technology to a technology for connecting to a security device, such as an NVR, DVR, or IP camera, to thereby communicate with the security device in a safe and convenient way.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for connecting to a security device by means of a Peer-to-Peer (P2P), comprising:
   a user terminal comprises:
   a non-volatile memory configured to save a P2P relay demon and a web browser; and
   a processor configured to read the P2P relay demon and the web browser from the non-volatile memory and execute the P2P relay demon and the web browser,
   wherein the P2P relay demon comprises a local web server that performs P2P communication with the security device by converting Hyper Text Transfer Protocol (HTTP) data into User Datagram Protocol (UDP) data; and
   wherein the web browser connects to the P2P relay demon using a HTTP,
   wherein in response to a user inputting an address of the security device into the web browser, the P2P relay demon establishes a P2P connection with the security device, so that a P2P communication is established between the user terminal and the security device.

2. The apparatus of claim 1, further comprising:
   an authentication server receiving security device identification information from the web browser, and, in response to activation of a P2P function of a security device corresponding to the received security device identification information, returning P2P connection information of the security device to the web browser.

3. The apparatus of claim 2, wherein the security device identification information is a Dynamic Domain Name System (DDNS) address of a security device.

4. The apparatus of claim 2, wherein the P2P connection information comprises P2P relay demon connection information and P2P connection identification information corresponding to the security device identification information.

5. The apparatus of claim 4, wherein the web browser connects to the P2P relay demon based on the P2P relay demon connection information and provides the P2P relay demon with the P2P connection identification information.

6. The apparatus of claim 5, further comprising:
   a P2P relay server receiving a request for a P2P address of a security device corresponding to the P2P connection identification information from the P2P relay demon, and provide the P2P relay demon with the requested P2P address.

7. The apparatus of claim 6, wherein the P2P relay demon establishes P2P connection with the P2P address provided by the P2P relay server.

8. The apparatus of claim 7, wherein the P2P relay demon transfers, to the web browser, web content acquired from the security device with which P2P connection has been established.

9. A method for connecting to a security device by means of a Peer-to-Peer (P2P) relay demon, comprising:
   requesting, by a web browser installed in a user terminal, P2P connection information corresponding to security device identification information from an authentication server;
   in response to activation of a P2P function of a security device corresponding to the security device identification information, returning, by an authentication server, P2P relay demon connection information and P2P connection identification information corresponding to the security identification information to the web browser;
   the web browser connecting to a P2P relay demon, which is installed on the user terminal, having a local web server based on the P2P relay demon connection information, and providing the P2P connection identification information to the P2P relay demon;
   requesting, by the P2P relay demon, a P2P address of a security device corresponding to the P2P connection identification information from the P2P relay server;
   providing, by the P2P relay server, the requested P2P address to the P2P relay demon; and
   establishing, by the P2P relay demon, P2P connection with the P2P address provided by the P2P relay server,
   wherein in response to a user inputting an address of the security device into the web browser, the P2P relay demon establishes a P2P connection with the security device, so that a P2P communication is established between the user terminal and the security device.

10. The method of claim 9, further comprising:
    transferring, by the P2P relay demon, to the web browser, web content acquired from the security device with which the P2P connection has been established.

* * * * *